ated Nov. 3, 1964

3,155,661
PROCESS FOR PRODUCING SUBSTITUTED GUANAMINES
Robert W. Foreman, Chagrin Falls, and Franklin Veatch, Lyndhurst, Ohio, assignors to The Standard Oil Company, Cleveland, Ohio, a corporation of Ohio
No Drawing. Filed Dec. 28, 1961, Ser. No. 162,964
11 Claims. (Cl. 260—249.9)

This invention relates to a process for the preparation of substituted guanamines, and more particularly to the reaction of cyanamide with nitriles to form the corresponding substituted guanamines.

Guanamines have been prepared by reaction of dicyandiamide and a nitrile in the presence of a basic catalyst such as an alkali or alkaline earth metal compound or a strongly basic amine such as piperidine or pyrrolidine. This reaction is usually carried out in a hydroxylated solvent. U.S. Patents 2,735,850 and 2,792,395 disclose and claim a modification of this reaction, using liquid ammonia as the reaction solvent. In this reaction, the ammonia apparently functions only as a solvent, and the alkali metal or alkaline earth metal compound such as the hydroxide or the strongly alkaline amine are still required to catalyze the reaction.

In accordance with the invention, it has been determined that a strongly alkaline catalyst, such as an alkali or alkaline earth metal compound, or strongly basic amine, is not required if cyanamide is employed as a starting material, rather than dicyandiamide, and if the reaction mixture contains a proportion of ammonia sufficient to direct the reaction in favor of ring formation, rather than dicyandiamide formation. Apparently, the ammonia catalyzes the reaction of dicyandiamide, if it is formed as an intermediate, to form a ring of the guanamine configuration, so that any dicyandiamide is consumed by reaction with the nitrile to form the guanamine. The reaction between the nitrile and the cyanamide can be carried out in the presence of a solvent, but this is not essential, inasmuch as the nitrile is a good solvent for cyanamide.

The reaction that takes place with the organic nitrile, including alkyl, alkenyl, aryl, alkaryl, aralkyl, cycloalkyl, and alkoxy nitriles, is believed to follow the following equation:

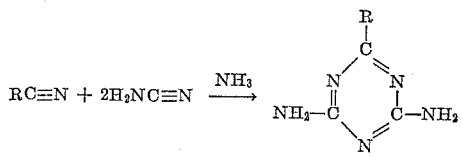

R in the guanamine is derived from the organic radical of the nitrile, and can be an alkyl, alkenyl, aryl, alkaryl, aralkyl, cycloalkyl or alkoxy radical, having from one to about thirty carbon atoms. Typical R radicals include, for example, methyl, ethyl, n-propyl, iso-propyl, n-butyl, iso-butyl, secondary butyl, tertiary butyl, iso-amyl, n-hexyl, iso-hexyl, 2-ethylhexyl, decyl, dodecyl, octadecyl, allyl, ricinoleyl, oleyl, behenyl, phenyl, naphthyl, cyclohexyl, cyclopentyl, cycloheptyl, xylyl, tolyl, benzyl, alpha-phenethyl, beta-phenethyl, methylcyclohexyl, ethyl cyclopentyl, methoxymethyl, propoxyethyl, butoxymethyl, octadecoxymethyl, methyl-8-octadecenoxyethyl and behenoxyoctyl.

These groups may contain additional guanamine groups if the nitrile reactant has more than one nitrile group.

The reaction will take place with any non-homopolymerizable nitrile that is free from other groups reactive with cyanamide or ammonia, and that has one or a plurality of nitrile groups. A mononitrile gives rise to a monoguanamine, while a dinitrile can react at both nitrile groups to give a diaminotriazine compound. Thus, for example, dinitriles such as succinonitrile give diamino-s-triazinyl ethane:

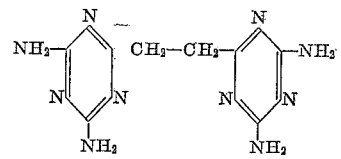

Those skilled in the art will perceive from the above that any of the following nitriles, to mention only a few, can be effectively employed in the process of the invention: acetonitrile, propiononitrile, 3-butenonitrile (allyl cyanide), butyronitrile, oleonitrile, isobutyronitrile, benzonitrile, cyclohexylnitrile, adiponitrile, glutaronitrile, succinonitrile, 1,4-dicyanocyclohexane, methoxyacetonitrile, ethoxybutyro-nitrile, and alpha-phenyl propiononitrile.

The reaction will proceed at an elevated temperature above about 90° C. and preferably above about 150° C. There is no critical upper limit on reaction temperature except that imposed by the stability of the reactants and the guanamine reaction product. However, reaction temperatures in excess of about 250° C. usually are not required, and temperatures between about 150° C. and 200° C. are preferred.

A sufficient pressure is imposed to maintain the reactants in the liquid phase. The pressure required will, of course, depend upon the reaction temperature and the volatility of the nitrile, and the amount of ammonia present. A sufficient pressure of ammonia is required in order to direct the reaction in favor of guanamine formation. In general, an amount of ammonia within the range from about 0.5 to about 10 mols per mol of cyanamide is adequate, and amounts of from 3.5 to 6.5 mols per mol of cyanamide are preferred. Accordingly, reaction pressures of from 100 to about 1000 p.s.i.g. usually are employed, although from 300 to 600 p.s.i.g. are adequate. Ammonia is not consumed in the reaction, and after completion of guanamine formation, the ammonia and the solvent, if any, together with unreacted nitrile can be recovered and recycled.

The reaction is conducted in a pressure vessel adequate to withstand the pressures required. The cyanamide and nitrile are combined either before or after being put in the vessel, and the mixture then pressured with the desired amount of ammonia and brought to reaction temperature. The reaction proceeds rapidly, and is ordinarily complete in about one to four hours, although frequently, particularly at elevated temperatures and high pressures, the reaction may be completed in about ten minutes.

The nitrile and cyanamide are reacted in at least approximately stoichiometric proportions, with an excess of nitrile if desired to serve as a solvent for the cyanamide. Stoichiometrically, 0.5 mol of nitrile is required for each mol of cyanamide, but an amount of nitrile as high as 20 mols per mol of cyanamide can be used. Ratios of from about 1 to about 10 are usually preferred inasmuch as no more than 10 mols of nitrile is normally needed for solution of the amount of cyanamide employed.

The guanamines which are prepared in accordance with the invention are for the most part known compounds and can be used as intermediates in dye formation, flameproofing agents, surface active agents when the R radical is a long chain alkyl group having from eight to thirty carbon atoms, tarnish inhibitors in synthetic detergent compositions, resin modifiers, textile softeners and water repellents, particularly when the R radical is a long chain alkyl group having from twelve to thirty carbon atoms, and as chemotherapeutic agents.

The reaction of this invention can easily be adapted for production of guanamines on a continuous basis starting from a cyanogen halide. Copending application Serial No. 137,524 filed September 12, 1961, of which this application is a continuation in part, describes and claims the ammonolysis of cyanogen halides in an inert solvent to yield cyanamide. Organic nitriles that are solvents for cyanamide and also for cyanogen halides but not for guanamines are useful in this process. Accordingly, it is possible to produce guanamines directly from cyanogen halides by dissolving a suitable quantity of a cyanogen halide in an organic nitrile meeting these solubility requirements. The process is applicable to any cyanogen halide. Cyanogen bromide is preferred but cyanogen fluoride, cyanogen chloride and cyanogen iodide can also be employed.

In the preparation of guanamine from cyanogen halide on the aforesaid continuous basis, it is important that the reaction mixture contain a slight excess of ammonia, in order to obtain complete reaction of the cyanogen halide. Hence, the ammonia-to-cyanogen halide ratio should be at least 2. Ratios in excess of about 2.25 lead to undesirably large amounts of residual halide in the solution, and accordingly, the preferred range of ratios is from about 2 to 2.25.

The reaction is exothermic. The amount of heat to be removed is rather large, approximately 56 Kcal. per mol. Therefore, it may be desirable to cool the reactants to a very low temperature initially; the reaction will start at temperatures as low as −40° C. The optimum yields are obtained at reaction temperatures of from 0° C. to about 10° C., but temperatures as high as 80° C. to 100° C. can be used advantageously under pressure to maintain the cyanogen halide in the liquid phase. Because the reaction is exothermic, it is rather rapid, and is complete in from 15 minutes to a few hours' time. The reaction proceeds very rapidly at room temperature, and is complete in about 30 minutes.

The lower the reaction temperature, the more compact the deposit of ammonium halide crystals that is obtained, and this type of deposit is advantageous because of easy filtration. At temperatures above or near the boiling point of the cyanogen halide used, about 60° C. in the case of cyanogen bromide, a large amount of the halide will appear in the vapor phase above the reaction mixture, and this may be undesirable because of the loss of cyanogen halide in undesired side reactions. This problem can be avoided by application of superatmospheric pressures at such temperatures. In order to avoid the formation of undesired by-products, the reaction temperature should not be permitted to exceed about 100° C.

The concentration of the reactants in the reaction solution can be widely varied. Good yields of cyanamide are obtainable at concentrations of cyanogen halide as low as about 0.01%. The maximum concentration is imposed only by the solubility of cyanogen halide in the solvent, i.e., up to a saturated solution, and it is also possible to disperse in the reaction mixture more cyanogen halide than can be dissolved therein initially, inasmuch as the cyanogen halide will dissolve as it is consumed in the reaction. The cyanogen halide concentration has no apparent effect upon the yield of cyanamide or ammonium halide.

The solvent employed should be substantially anhydrous, for optimum yields. Ammonium halide is extremely soluble in water, and the presence of water can therefore lead to losses of this product, thus increasing the cost of operation. However, the reaction will proceed in the presence of water, and rather large amounts can frequently be tolerated, up to about 10% by weight of the solution.

It is usually preferable in carrying out the reaction to dissolve the cyanogen halide in the solvent, bring the solution to the reaction temperature and then admit ammonia gas or liquid ammonia at a rate sufficient to permit control of the reaction temperature within the desired range. The reaction system should be provided with a means for carrying off the heat liberated, such as refluxing beneath a condenser, or by cooling coils inserted within the reaction vessel, or by a cooling jacket enclosing the reaction vessel. The refluxing temperature can be lowered if the solvent has a higher boiling point than the desired reaction temperature, by including a small amount of a compatible inert lower boiling liquid, such as isopentane, pentane and dimethyl ether. As the reaction proceeds, ammonium halide will separate out, and it will be desirable to agitate the system to maintain uniformity. After reaction is completed, usually in from 15 minutes to about 5 hours, the precipitated ammonium halide is removed, such as by filtration, decantation, or centrifugation. If it is desired that the cyanamide solution be more concentrated for the subsequent reaction with the nitrile, a portion of the nitrile used as the solvent in the ammonolysis reaction can be separated by vacuum or atmospheric pressure distillation at a temperature below that at which the cyanamide will be dimerized to dicyandiamide, trimerized to melamine, or otherwise decomposed or polymerized.

The crude cyanamide solution that is recovered at the conclusion of the reaction contains principally cyanamide with small amounts of dicyandiamide and triazines such as ammeline and ammelide. At the higher reaction temperatures, a larger proportion of dicyandiamide and triazines are obtained. The cyanamide can be freed from such impurities by cautious distillation or by recrystallization from a solvent for cyanamide that is a nonsolvent for the higher polymers of cyanamide, such as a mixture of diethyl ether and benzene, or chloroform, or carbon disulfide.

The reaction of this invention can also be adapted for production of guanamines on a continuous basis starting from hydrogen cyanide and ammonia. In the commercial process for making guanamine wherein the cyanogen halide is obtained by the electrochemical reaction of hydrogen cyanide and ammonium halide in an electrolytic cell, such as is described in application Serial No. 95,479, now U.S. Patent 3,105,023, cyanogen halide feed from the cell anolyte stripping still is dissolved in a nitrile meeting the solubility requirements of application Serial No. 137,524 and then subjected to ammonolysis as described above. The slurry that is obtained is pumped to settlors after the ammonia addition to complete both the reaction and crystallization of ammonium halide. The slurry is then pumped to centrifuges, where the ammonium halide is separated, washed and dried, and recycled to the reaction with hydrogen cyanide. The cyanamide solution, which may be concentrated somewhat if desired, is then pumped into an autoclave, which is pressured with ammonia and brought to the temperature for the interaction between the cyanamide and the organic nitrile to form the corresponding guanamine.

At the completion of the ammonolysis reaction and filtration to remove the solid ammonium halide by-product, optionally, there may be a concentration step wherein some of the organic nitrile is removed by evaporation and recycled to the ammonolysis reaction. The concentration step is not essential, since the reaction between cyanamide and the organic nitrile will proceed satisfactorily in the presence of a large excess of organic nitrile. However, because of the high temperatures involved in the reaction, substantial economic benefit can be achieved by concentration. Generally, concentration will be under reduced pressures at as low a temperature as possible. The concentration of cyanamide in the final material should at least be about two moles per mole of organic nitrile. Concentrations of cyanamide below this amount are not satisfactory. The trimerization reaction can then be carried out, as indicated above, to form the corresponding guanamine.

The following examples in the opinion of the inventors represent preferred embodiments of their invention:

EXAMPLES 1 TO 3

A one liter stainless steel Parr pressure apparatus was used in these experiments, with a Pyrex glass insert to prevent corrosive attack on the walls of the autoclave. The cyanamide was dissolved in acetonitrile in the amount given in the table below, and the weighed portion of ammonia noted in the table fed in as liquid ammonia from a small stainless steel transfer bomb. A control was run without ammonia, for comparison purposes. The autoclave was closed, and heated to reaction temperature over a one-hour period. The vessel was heated for the reaction time at the temperature and pressure given in the table, and the autoclave then shut off and allowed to cool to room temperature without auxiliary cooling. The ammonia was then vented to the atmosphere and the autoclave opened.

The guanamine was insoluble in the excess nitrile remaining at the conclusion of the reaction, and was separated by centrifuging, weighed and analyzed. The acetoguanamine was a light brown or nearly white granular solid, shown to be substantially pure by infrared analysis, using the technique described in the bulletin entitled "Guanamines," published by the American Cyanamid Company, Inc., December 1951.

uct was observed to be a light brown mass of crystals which was thereafter dissolved in hot water, clarified with charcoal and recrystallized. The 58 grams of white crystalline product obtained was identified as acetoguanamine, melting point 272–273° C.

EXAMPLE 5

A solution containing one mole of cyanogen bromide dissolved in 3.5 moles of benzonitrile was added to a reaction vessel as in Example 1, and 2.2 moles of ammonia gas were thereafter added. After the addition of the ammonia was complete, the reaction mixture was allowed to stand for 20 minutes and was thereafter filtered. The solid product identified as ammonium bromide was washed with two 20 ml. portions of benzonitrile and the washed liquids transferred to the filtrate. The filtrate was thereafter concentrated to a 0.5:1 benzonitrile:cyanogen bromide molar ratio. The concentrate was thereafter mixed in an autoclave to which one mole of ammonia gas was added and was then heated at 175° C. for one hour. After the autoclave was cooled, the contents thereof were treated with hot water to remove any dissolved contaminants. The solid material remaining was dissolved in dilute hydrochloric acid and clarified with vegetable charcoal. After the solution was rendered alkaline, a white product was obtained which after wash-

*Table I*

| Example No. | Reactants | | | Reaction Conditions | | | | Percent Conv. of $CNNH_2$ | Percent Yield Acetoguanamine | Percent Yield Dicyandiamide | Guanidine |
|---|---|---|---|---|---|---|---|---|---|---|---|
| | $CNNH_2$ (moles) | Acetonitrile (moles) | $NH_3/CNNH_2$ (mole ratio) | Preheating time (hrs.) | Temperature, °F. | Reaction time at Temp. (hrs.) | Pressure, p.s.i.g. | | | | |
| Control | 0.362 | 6.2 | 0 | 0.67 | 320 | 1.0 | 100–200 | 49 | 0 | 0 | 6.0 |
| 1 | 0.830 | 2.5 | 5 | 1.25 | 335–350 | 2.0 | 400–440 | 100 | 69 | trace | |
| 2 | 0.731 | 2.8 | 6.5 | 1.0 | 340 | 1.5 | 540–550 | 100 | 77 | trace | |
| 3 | 0.173 | 2.8 | 3.5 | 1.5 | 340 | 1.0 | 550 | 100 | 78 | trace | |

The control run in which no ammonia was used shows the importance of ammonia in the formation of acetoguanamine. The product, to the extent that reaction occured, was guanidine. In the presence of ammonia, as shown by Examples 1, 2, and 3 yields of acetoguanamine ranging from 69 to 78%, based on the amount of cyanamide used as a starting material, were obtained, with only traces of dicyandiamide, and no guanidine.

EXAMPLE 4

This example illustrates the preparation of acetoguanamine from a cyanogen halide, acetonitrile and ammonia. A solution containing 1 mole of cyanogen bromide in 6.6 moles of acetonitrile was prepared and added to a reaction vessel immersed in an ice water cooling bath in order to maintain the temperature within the reaction vessel below 20° C. 2.2 moles of ammonia gas were thereafter added slowly to the reaction vessel. After the ammonia was added, the reaction mixture was allowed to stand for 20 minutes and was then filtered. The solid product, identified as ammonium bromide, was washed with two 20 ml. portions of acetonitrile to remove any adhering liquid and the wash water was combined with the filtrate. The liquid filtrate was identified as a solution of cyanamide in acetonitrile.

The filtrate was then concentrated under reduced pressure (water pump) to a final concentration of 0.5 mole of acetonitrile per mole of cyanamide. The concentrate was transferred to a 300 ml. autoclave to which one mole of ammonia gas was added. The temperature of the autoclave was raised to 175° C. during a period of 30 minutes and was maintained at that temperature for one hour. Thereafter, the mixture was cooled and the proding and drying weighed 77 grams, was identified as benzoguanamine and exhibited a melting point in the range of 214–222° C.

EXAMPLE 6

The procedure of Example 5 was followed using a solution of one mole of cyanogen bromide dissolved in 2.9 moles of t-butoxy acetonitrile. Seventy-five grams of final product identified as t-butoxy acetoguanamine with a melting point of 234–235° C. were obtained. An additional 16 grams of cruder product was obtained by concentrating the mother liquors.

EXAMPLE 7

The procedure of Example 2 was followed using one mole of cyanogen bromide dissolved in 3.5 moles of phenyl acetonitrile. A yield of 78 gm. of phenyl acetoguanamine having a melting point in the range of 243–250° C. was obtained.

EXAMPLE 8

A solution of one mole of cyanogen bromide in dimethoxyethane, 25 grams of cyanogen bromide per 100 ml. of solution, was treated with 2.2 moles of ammonia gas in accordance with the procedure of Example 4. After the ammonium bromide was removed by filtration, the filtrate containing cyanamide dissolved in dimethoxyethane was subjected to evaporative conditions until a concentration of 60% cyanamide by weight was achieved. This concentrate was charged to an autoclave with 0.5 mole of oleonitrile and one mole of ammonia, and heated in accordance with the procedure of Example 4. After the autoclave was cooled, the contents were treated with hot water to remove any dissolved contaminants. The remaining solid material was recrystallized from dilute hydrochloric acid after clarification with vegetable charcoal by making the solution alkaline and identified as oleoguanamine.

We claim:

1. A process for the preparation of substituted guanamines which comprises reacting cyanamide with an organic nitrile having from two to about thirty carbon atoms in the liquid phase and in the presence of sufficient ammonia in an amount in the range from about 0.5 to about 10 moles per mole of cyanamide to direct the reaction towards guanamine formation at a reaction temperature within the range from about 90° up to about 250° C. at which the reaction proceeds.

2. A process in accordance with claim 1 in which the nitrile is an alkyl nitrile having from two to about thirty carbon atoms.

3. A process in accordance with claim 1 in which the nitrile is an aryl nitrile having from about six to about ten carbon atoms in the ring.

4. A process in accordance with claim 1 in which the nitrile is an alkaryl nitrile having from about seven to about thirty carbon atoms.

5. A process in accordance with claim 1 in which the nitrile is an aralkyl nitrile having from about seven to about thirty carbon atoms.

6. A process in accordance with claim 1 in which the nitrile is an alkoxy nitrile having from about two to about thirty carbon atoms.

7. A process in accordance with claim 1 in which the nitrile is acetonitrile.

8. A process for the production of substituted guanamines comprising reacting ammonia with a cyanogen halide in solution in an organic nitrile having from two to about thirty carbon atoms which is a solvent for the cyanogen halide and cyanamide to form a cyanamide solution, and thereafter causing the reaction of the cyanamide and the organic nitrile in the liquid phase in the presence of sufficient ammonia within the range from about 0.5 to about 10 moles per mole of cyanamide to direct the reaction towards guanamine formation at a temperature within the range from about 90° to about 250° C. at which the reaction proceeds.

9. A process in accordance with claim 8 wherein the ratio of ammonia to cyanogen halide employed in the formation of cyanamide is at least 2.

10. A process in accordance with claim 8 wherein the reaction to form cyanamide is carried out at a temperature below 100° C. and the reaction to form guanamine is carried out at a temperature within the range from about 90 to about 250° C.

11. A process as in claim 10 wherein the cyanamide is present as a solution in the organic nitrile prior to the formation of guanamine.

References Cited in the file of this patent

Cloez et al.: "Annalen der Chemie," vol. 78, 1851, pages 228–231.

Migrichian: "The Chemistry of Cyanogen Compounds," Reinhold Pub. Corp., N.Y., 1947, pp. 362–363.

Grundmann et al.: "Annalen der Chemie," vol. 577, 1952, pages 77–95.

Smolin et al.: "s-Triazines and Derivatives," pub. by Interscience Pub. Inc., N.Y., 1959, pp. 229–230.